Figure 1:
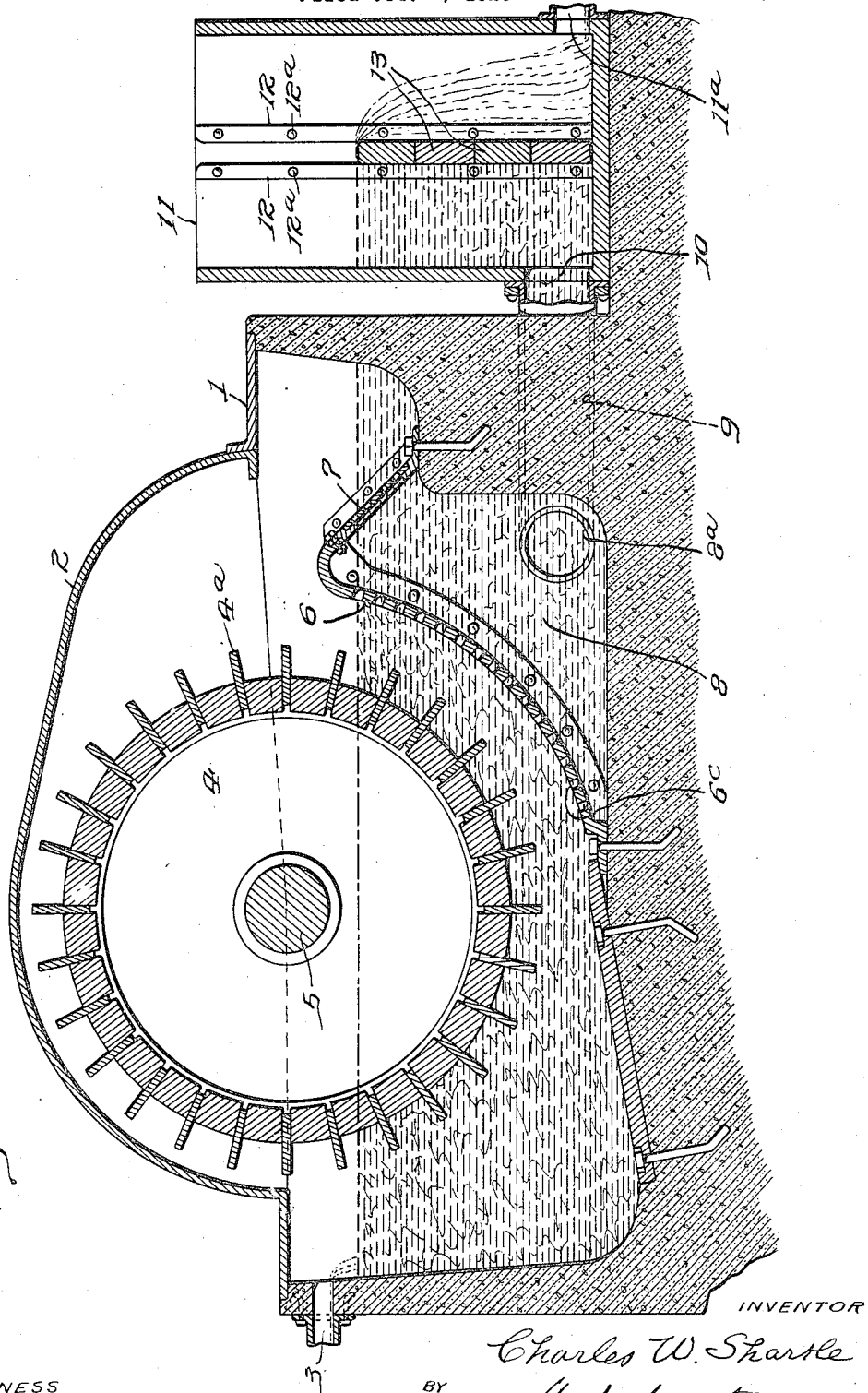

July 29, 1924.  
C. W. SHARTLE  
1,503,138  
PROCESS OF PRODUCING PAPER PULP AND APPARATUS THEREFOR  
Filed Oct. 1, 1923  
2 Sheets-Sheet 1

WITNESS  
INVENTOR  
Charles W. Shartle  
BY  
ATTORNEY

July 29, 1924.
C. W. SHARTLE
1,503,138
PROCESS OF PRODUCING PAPER PULP AND APPARATUS THEREFOR
Filed Oct. 1, 1923    2 Sheets-Sheet 2
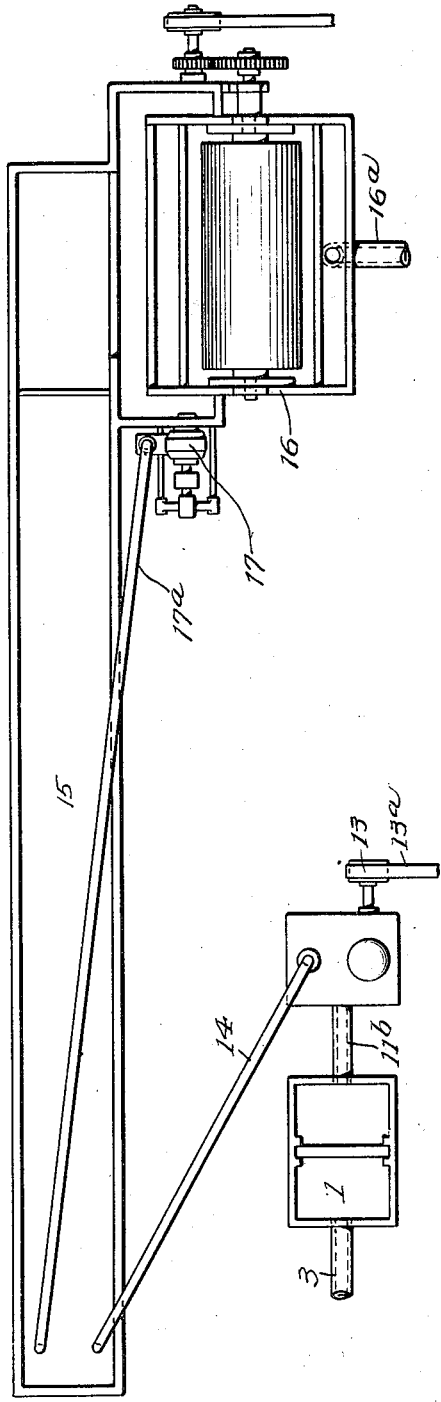
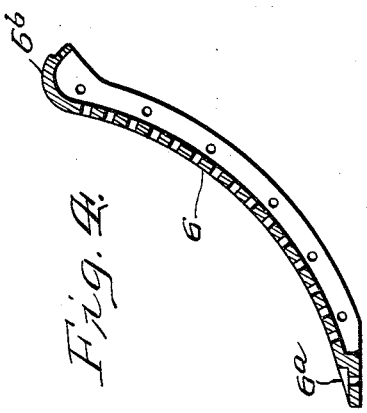
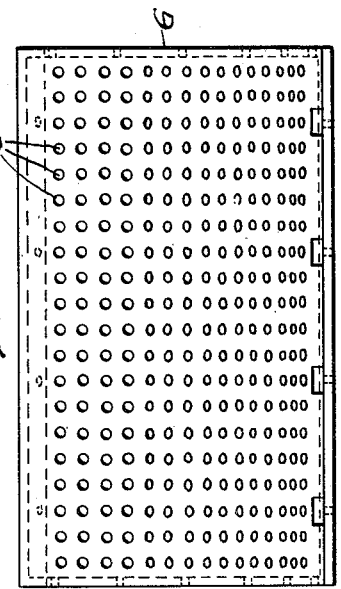
INVENTOR
Charles W. Shartle
WITNESS
F. G. Hartman.
BY
H. S. Hatton
ATTORNEY Patented July 29, 1924.

1,503,138

UNITED STATES PATENT OFFICE.

CHARLES W. SHARTLE, OF MIDDLETOWN, OHIO, ASSIGNOR TO THE SHARTLE BROTHERS MACHINE COMPANY, OF MIDDLETOWN, OHIO, A CORPORATION OF OHIO.

PROCESS OF PRODUCING PAPER PULP AND APPARATUS THEREFOR.

Application filed October 1, 1923. Serial No. 665,756.

*To all whom it may concern:*

Be it known that I, CHARLES W. SHARTLE, a citizen of the United States, residing at Middletown, in the county of Butler, State of Ohio, have invented certain new and useful Improvements in Processes of Producing Paper Pulp and Apparatus Therefor, of which the following is a specification.

My present invention has for its objects to provide a simplified process and an equally simplified apparatus to practice it, both well adapted, under some circumstances, to produce very satisfactory results at a much reduced cost for mechanism and labor of operating it; and while my novel method and means employ certain steps and mechanisms well known in the art, they involve a new and simplified order and arrangement of use of them, or some of them, and the employment therewith of one or more new elements in a certain combination and relative arrangement therewith, to produce a new mode of operation as constituting chiefly the new and simplified method and means above referred to, as my primary purpose.

To these ends my new and simplified system of reducing raw stock to pulp has as its distinguishing characteristics the conventional breaker modified to comprise means in itself to separate out, from time to time and to discharge, by gravity, such of the raw stock as is sufficiently reduced in the first instance, and the employment in co-ordinated arrangement therewith, of means operating automatically to maintain a constant height of water and raw stock, in the breaker, and to receive therefrom and deliver to other instrumentalities for further treatment, the reduced stock discharged from the breaker from time to time without disturbing the continuity of the normal reducing action of the breaker on raw stock supplied thereto from time to time.

Stated more specifically my new and simplified method, is exemplified by the utilization, in a breaking engine, of a basal chambered portion formed by a perforated back fall, such for example as contained in the beating engine shown in Buehler's patent (owned by me) No. 1,271,426, dated July 2, 1918, though preferably without the fixed member which co-operates with the blades on the circulating roll and which causes it to operate as a grinder or beater; my simplified system utilizes also the discharge opening from said chambered portion at the base of the breaker, in a novel co-ordinated combination therewith of the new member of my system which is a receiver or head box into which the reduced stock or pulp is discharged from the breaker by gravity, and through which it passes, solely by force of its own momentum, to a settling trough; the receiver or head box comprising vertically adjustable means, over the top of which the discharged reduced stock overflows, and means thereby operating to maintain the water and raw stock in the breaker at the same level to which it is adjusted and which is preferably that of the top edge of the perforated wall of the back fall. Manifestly the normal discharge of reduced stock or pulp from the breaker is somewhat retarded, sufficiently to allow of full treatment of raw stock supplied from time to time to the breaker until reduced sufficiently to pass through the perforated back fall, it being well known that the various parts of the raw stock treated will soften and be reduced in varying lengths of time to bring them into a like degree of fineness; so that the action of the system throughout is continuous.

In the accompanying drawings illustrating an embodiment of my invention: Fig. 1 is a vertical section taken through the length of the primary elements of the system, and designed to show their operative relation. Fig. 2 is an elevation showing diagrammatically the regulator and its pump, the settling box, and tubular connection between them, the wet machine and the pump, and tubular connection leading therefrom to the settling box. Fig. 3 is a front elevation of the perforated backfall plate, detached; and Fig. 4 is a sectional view thereof.

Referring now to said drawings, 1 indicates a breaking engine, of the usual type and construction, except as hereinafter stated, the function of which is to initially receive the stock, such as books, bundles of paper, etc., which is to be reduced to pulp, and adapted to contain a body of water at a preferably minimum level; 2 is its cover; 3 is the inlet for water; 4 the rotatable circulating roll, provided peripherally with paddles 4ª, and mounted on a rotating shaft 5 transversely disposed through the side walls of the engine, with usual means to operate it; 6 is a perforated back fall, hereinafter described, with means 7 to support its upper end within the breaking engine in such manner as to form a chamber 8 therein at its opposite end, which is closed except through the perforated back fall; and 8ª indicates an outlet from this chamber, communicating directly with a horizontally-disposed conduit or pipe 9 located at a level substantially in line with the basal interior of the breaking engine; this conduit, if a pipe, passing through the wall of the engine adjacent to the outlet 8ª therein and communicating at its opposite end with an inlet 10 on a like level, in a contiguous receiver 11, which has an outlet 11ª on a like level. The receiver is a rectangular box, having a centrally disposed skeleton frame 12, 12, which may be secured by bolts indicated at 12ª, to the opposite walls of the receiver, and serving as a guide way for a series of boards 13 manually adjustable vertically, over which the volume of water and reduced stock or pulp passes from the breaker chamber, hence the adjusted height thereof governs the level, from time to time, of the water and raw stock in the breaking engine.

The back fall plate 6 is preferably of a curvilinear shape, as shown in section in Fig. 4; its lower end terminating in bracket 6ª to enable it to be securely fastened to the interior basal wall of the engine, and its upper end terminating in a hook-shaped portion 6ᵇ to enable it to be securely attached to a member 7 which is merely a metal plate operating to support it and to assist in forming the chamber 8. This member may or may not be perforated, like the back fall plate as may be desired, preferably not. The back fall plate 6 is perforated throughout, as indicated at 6ᶜ in Fig. 3.

The perforations in the backfall plate may be of any predetermined size to accord with any desired degree of fineness of the reduced stock which would pass through it, and of any predetermined shape to facilitate the reduction to and discharge of the softened stock which the momentum of the moving current forces against it and through it.

Communicating directly with the regulating receiver 11, through a conduit or pipe 11ᵇ leading from the outlet 11ª therein, is a pump 13, having usual means indicated at 13ª to operate it; 14 is a pipe leading therefrom and 15 a settling trough of any usual type, and with which said pipe 14 communicates. A wet machine, of any usual construction, is indicated at 16, with a discharge outlet 16ª leading to a pulp chest or to any added means for any desired further treatment of the pulp; 17 is another like pump communicating with the wet machine, with a pipe 17ª leading from such pump to the settling trough.

Usually the delivery of reduced stock or pulp from the receiver or head box to the settling trough is preferably effected by a pump, as shown in the drawing, and that is the most rapid and effective way, but if the supporting devices of the settling trough are such as to bring the conduit between it and the receiver on a level with the outlet from the former or slightly below it, the pulp will discharge into the settling trough by gravity.

Heretofore the settling trough has always been supplied with a screened top, but in my new method and means coordinated as described I can frequently dispense with it.

It is desirable to keep the reduced stock, discharged into the settling trough, very thin, and to that end the system is preferably supplied with a pump between the discharge end of the wet machine and the settling trough operating to return the extracted water back to the trough.

In the operation of the method the new stock placed from time to time in the breaker is subjected to rotative attrition therein, by the paddles of the circulating roll in a continuously large volume of water supplied through the inlet supply pipe. Parts of such raw stock will soften and be reduced to varying degrees of fineness and in varying lengths of time, as is well known. Such of the reduced stock as reaches the required degree of fineness will pass out through the perforated back fall, due to gravity aided by the momentum imparted to the water and pulp by the current of the former under rotative propulsion. This discharge is slightly retarded, sufficiently, by the adjustable device of the head box or receiver, to maintain the continuously-supplied body of water in the breaker to a height level with the top edge of the regulating device aforesaid which, preferably, is adjusted to the plane of the upper or top edge of the back fall plate; thus I get a constant reducing action on the raw stock until it is fine enough to pass into the basal chamber of the breaker through the perforated back fall thereof, and at same time am enabled to keep the breaker supplied with raw stock from time to time as the reduction proceeds and the results, as pulp, are discharged to and through the receiver and thence, by pumping device or by gravity as hereinbefore stated, delivered to the settling trough and from thence to the wet machine and finally to a stuff chest.

I claim:—

1. In a pulp-making system, the method described of reducing continuously supplied raw stock to a predetermined degree of fineness and drawing off the same as the reduction proceeds, which consists in subjecting it to the action of a breaker which includes a screened discharge chamber arranged to cause a gravity discharge of the reduced stock to and through a receiving vessel which includes in itself adjustable means to automatically maintain the water and raw stock in the breaker at a level with said means so adjusted.

2. In a pulp-making system, the method described which includes the employment of a breaker comprising means in itself to separate out and discharge by gravity, such of the raw stock as is reduced from time to time, and the employment in co-ordinated arrangement therewith of means to receive and discharge to other instrumentalities, by gravity, the reduced stock discharged from the breaker without disturbing the normal reducing action thereof on raw stock added thereto from time to time as the reduction proceeds.

3. In a pulp making apparatus, continuously operative to receive raw stock supplied from time to time to a reducing engine and to discharge therefrom, by gravity, only such part thereof as shall be reduced to a predetermined degree of fineness, the combination with a breaker containing in itself means to screeningly separate such reduced stock as the reduction proceeds, of means co-acting therewith to receive and discharge such discharged stock said means including an inlet and an outlet and an intermediate and vertically adjustable device operating to cause the reduced stock and water to pass over said adjustable device on its passage through said receiving means.

4. In a pulp-making system in combination with the following elements in co-ordinated arrangement, a breaker having a chambered portion formed by a perforated back-fall, a conduit leading from the base of said chamber, a receiver having an inlet operative to receive, by gravity, the reduced stock discharged through said conduit, an oppositely-disposed outlet and an interiorly-contained vertically-adjustable means operative to cause the reduced stock to overflow the same to effect its passage through said receiver and operative also to maintain the water and raw stock in the breaker at a predetermined level.

5. In a pulp-making system, in combination, a braker including in itself a chamber formed by a perforated back-fall operating as a screen and located in the direction of the flow of water and raw stock in said breaker, a conduit leading from said chamber, means having an inlet in the same horizontal plane therewith and operating to receive, by gravity, the reduced stock or pulp discharged through said conduit, said means comprising an adjustable device to regulate the flow of reduced stock and water through it, a settling trough, a wet machine, tubular connections between each of said elements, and means to return to the settling trough the water extracted by the wet machine from the reduced stock passing through it.

CHARLES W. SHARTLE.